3,210,427
METHOD OF PRODUCING ALDEHYDE OF
TRANS,TRANS-2.6 VITAMIN A
Joseph Redel and Geneviève Nicolaux, Commentry,
France, assignors to Societe Anonyme dite: A.E.C.
Societe de Chimie Organique et Biologique, Commen-
try, France
No Drawing. Filed Mar. 9, 1962, Ser. No. 178,585
Claims priority, application France, Mar. 14, 1961,
855,524, Patent 1,291,622
2 Claims. (Cl. 260—598)

It is known that retinene (also called aldehyde of vita-
min A and having the following formula) obtained by
synthesis consists of a mixture of geometrical isomers.

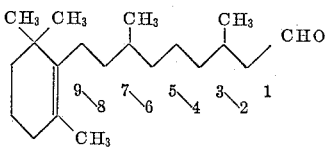

Each double bond may give rise to the cis-trans isomer-
ism, the latter being effective mainly on the double bonds
at 2 and 6. These isomers are distinguished by effecting
the addition reaction with maleic anhydride. It is known
in fact that trans,trans-2.6 retinene also called "all-trans"
retinene) yields very rapidly a product of addition and
that on the contrary the cis-2 isomers react slowly. The
latter are the cis trans-2.6 retinene (neoretinene a) and
cis,cis-2.6 retinene.

It is noted that the mixture of geometric isomers of
the aldehyde of vitamin A obtained through the known
synthesis methods, such as described in the French Patent
No. 1,234,824, react rapidly with maleic anhydride in a
proportion of about 70%. This mixture consists in fact
of 70% of trans retinene, the residue being mainly neo-
retinene a.

Since only the trans,trans-2.6 isomer (also called all-
trans isomer) is converted by reduction into trans vitamin
A having the maximum biological activity, the possibility
of converting the mixture of retinenes into all-trans iso-
mers is particularly advantageous. It is known that trans,
trans-2.6 retinene is the only isomer capable of combin-
ing with dihydroxy-benzenes to yield crystallized com-
plexes. There has been described, notably in the French
Patent No. 1,288,975 filed at the same date by the
same applicants for "Crystallized Complexes Formed by
the Trans,Trans-2.6 Retinene With Pyrocatechol and Its
Halogen Derivatives," the molecule-to-molecule complex
between the all-trans retinene and pyrocatechol, as well as
the complexes with the tetrachloro- or tetrabromo-pyro-
catechols in the proportion of 2 molecules of retinene per
molecule of phenol. These compounds develop in the
mass of the isomer retinenes whereby the trans retinene
can be isolated while leaving the cis isomers (mainly neo-
retinene a) in the solution.

To convert the whole of retinene into vitamin A, the
remaining cis derivatives are usually isomerized into trans
retinene. One of the isomerization methods successfully
applied to vitamin A is the iodine method (cf. Zechmeister,
Experientia 1954, 10, 1–11). In general, this method con-
verts cis isomers into trans isomers, but nevertheless it
leads to a state of equilibrium. Another isomerization
method consists in treating with acids, preferably hy-
dracids. This method was applied mainly to the cis-trans
isomerism consisting of the (cis) maleic acid-(trans)
fumaric acid (cf. Beilstein, vol. II, p. 750) by converting
the cis isomer into the trans isomer. Both methods were
applied with success to the isomerization of the mixture
of retinenes containing 70% of trans isomer and 30%
of cis-trans isomer (mainly neoretinene a). However, an
isomerization is a reaction of equilibrium and therefore
successive isomerizations must be effected with intermedi-
ate separations of trans,trans retinene formed. Therefore,
the complete transformation of a retinene mixture into
trans,trans isomers is a long and difficult operation.

It is the chief object of this invention to avoid this
drawback.

To this end, this invention provides a method of con-
verting a mixture of isomer retinenes into trans,trans-2.6
retinenes, characterized in that there is formed simul-
taneously within the mixture a complex of the trans,trans
derivative with a dihydroxy-benzene, and the isomeriza-
tion into a trans,trans derivative of the isomers other
than trans,trans by means of an isomerizing agent con-
sistent with the compounding agent.

By adhering to this method the trans,trans derivative
from the isomerization is complexed as it develops where-
by the equilibrium of the isomerization reaction is con-
stantly displaced and the last-named reaction can take
place completely in a single, relatively rapid operation.
While several days are necessary for converting a mixture
of retinenes into all-trans retinene through the known
method of alternate complexations and isomerizations,
only a few hours are sufficient to carry out the same con-
version through the method of this invention, that is, the
simultaneous complexation and isomerization.

The formation of phenol-retinene complexes as applied
to a retinene mixture permits of isolating in complex form
50 to 60% of the total retinene. The simultaneous iso-
merization according to this invention, which is obtained
by using only a very small amount of iodine or acid, and
with the latter even at room temperature, affords a sub-
stantial conversion which in the most favorable cases
yields in a single step and in complex form from 90 to
100% of the initial retinene.

This isomerization can be effected by using hydriodic
acid, hydrobromic acid, hydrochloric acid, nitric acid, sul-
furic acid and p-toluene sulfonic acid with yields varying
according to the quantities and nature of the acid utilized.

Di-phenols suitable for this application are pyrocatechol
and its halogenated derivatives, or hydroquinone of which
the crystallized complex with trans retinene was described
by assignors to Eastman-Kodak in the French Patent No.
1,098,521 of February 24, 1953.

When the complexing agent is pyrocatechol or its tetra-
halogenated derivatives, iodine is not favorable as an
isomerization agent.

The invention will now be exemplified through the
following examples:

Example 1.—(Complex with pyrocatechol in the
presence of hydriodic acid)

To 38 grams of retinene, having a value E 380 m$\mu$
=1,100 and containing 30% of isomers reacting slowly
to maleic anhydride, 12 grams of pyrocatechol and, after
dissolution, 50 cc. of petrol are added. Then 0.2 cc. of
57% hydriodic acid diluted in 0.8 cc. of isopropanol are
added. The mixture is allowed to stand overnight at
−10° C. Then 2 volumes of petrol are added and the
mixture is finally filtered to yield 35.65 grams of complex,
E 380 m$\mu$=990, corresponding to an absorption yield of
84.7%.

Example 2.—(Complex with tetrachloropyrocatechol in
the presence of hydriodic acid)

76 grams of tetrachloropyrocatechol are added to 222
grams of retinene, value E 380 m$\mu$=870, containing 30%
of isomers reacting slowly to maleic anhydride. After
the dissolution, 560 cc. of oil and 0.8 cc. of 57% hydriodic
acid diluted in 3.2 cc. of isopropanol are added. The
mixture is stirred and allowed to stand overnight at +4°
C. After filtration, 167 grams of complex having a value E 380 mμ=1,022 are obtained, representing an absorption yield of 88%.

*Example 3.—(Complex with tetrachloropyrocatechol in the presence of hydrobromic acid)*

18 grams of tetrachloropyrocatechol are added to 52.3 grams of retinene, value E 380 mμ=875, containing 30% of isomers reacting slowly to maleic anhydride. After dissolution, 100 cc. of light petrol and 0.15 cc. of 48% hydrobromic acid diluted to one-tenth in isopropanol are added. The mixture is allowed to stand overnight at +4° C., then filtered to yield 39.5 grams of complex, value E 380 mμ=1,030, constituting a 89% absorption yield.

*Example 4.—(Complex with tetrachloropyrocatechol in the presence of hydrochloric acid)*

15 grams of tetrachloropyrocatechol are added to 40 grams of retinene, value E 380 mμ=1,050, containing 30% of isomers reacting slowly to maleic anhydride. After dissolution, 100 cc. of light petrol and 0.2 cc. of concentrated hydrochloric acid (density=1.19) are added. The mixture is allowed to stand overnight at +4° C. and filtered to yield 35.7 grams of a complex, value E 380 mμ=908, representing an absorption yield of 77.2%.

*Example 5.—(Complex with tetrachloropyrocatechol in the presence of paratoluene-sulfonic acid)*

16.7 grams of tetrachloropyrocatechol are added to 47 grams of retinene, value E 380 mμ=925, containing 30% of isomers reacting slowly to maleic anhydride. After dissolution, 100 cc. of light petrol and 0.1 gram of paratoluene-sulfonic acid in 0.4 cc. of isopropanol are added. The mixture is allowed to stand overnight at +4° C. After filtration, 30 grams of complex, value E 380 mμ=985, are obtained, representing an absorption yield of 68%.

*Example 6.—(Complex with tetrachloropyrocathechol in the presence of nitric acid)*

16.7 grams of tetrachloropyrocatechol are added to 47 grams of retinene, value E 380 mμ=925, containing 30% of isomers reacting slowly to maleic acid. After dissolution, 100 cc. of light petrol and 0.1 cc. of nitric acid (density=1.33) diluted in 0.4 cc. of isopropanol are added. The mixture is allowed to stand overnight at +4° C., and fitered to yield 35.6 grams of complex, value E 380 mμ=908, that is an absorption yield of 74.5%.

*Example 7.—(Complex with hydroquinone in the presence of hydriodic acid)*

41.6 grams of retinene, value E 380 mμ=977, containing 30% of isomers reacting slowly to maleic anhydride, are dissolved while stirring in 35 cc. of ethyl ether. Then 6 grams of hydroquinone are added, and the mixture is strongly stirred. The compound begins to form itself very rapidly. Then 0.1 cc. of 57% hydriodic acid is added while stirring. The mixture is allowed to stand overnight at room temperature (circa 25° C.) and then 4 to 5 volumes of petrol are added. The mixture is then filtered to yield 32.17 grams of complex, value E 80 mμ=1,252, that is, an absorption yield of the order of 99% of the total retinene.

*Example 8.—(Complex with hydroquinone in the presence of hydrobromic acid)*

46 grams of retinene, value E 380 mμ=956, containing 30% of isomers reacting slowly to maleic anhydride are dissolved in 35 cc. of ethyl ether, whereafter 9 grams of hydroquinone are added while stirring. Then 0.2 cc. of 48% hydrobromic acid are added while stirring strongly. The mixture is allowed to stand overnight at room temperature and then 4 to 5 volumes of oil are added. After filtration, 34.95 grams of complex, value E 380 mμ=1,115 are obtained, representing an absorption yield of the order of 96% of the total retinene.

*Example 9.—(Complex with hydroquinone in the presence of hydrochloric acid)*

46 grams of retinene, value E 380 mμ=956, containing 30% of isomers reacting slowly to maleic anhydride, are dissolved in 35 cc. of ethyl ether and then 9 grams of hydroquinone are added thereto while stirring. Then 0.3 cc. of concentrated hydrochloric acid are added, and the mixture is properly stirred. After allowing the mix to stand overnight at room temperature, 4 to 5 volumes of petrol are added. After filtration, 33.95 grams of complex are obtained value E 380 mμ=1,121, representing an absorption yield of the order of 93% of the total retinene.

*Example 10.—(Complex with hydroquinone in the presence of sulfuric acid)*

45 grams of retinene, value E 380 mμ=957, containing 30% of isomers reacting slowly to maleic anhydride are dissolved in 35 cc. of ethyl ether, and 9 grams of hydroquinone are subsequently added thereto while stirring. Then 0.2 cc. of pure concentrated sulfuric acid are added, the mixture is allowed to stand overnight at room temperature. Then 4 to 5 volumes of petrol are added, the mixture being subsequently filtered to yield 33.75 grams of complex, value E 380 mμ=1,042, representing an absorption yield of 81%.

*Example 11.—(Complex with hydroquinone in the presence of paratoluene-sulfonic acid)*

50 grams of retinene, value E 380 mμ=930, containing 34% of isomers reacting slowly to maleic anhydride, are dissolved in 35 cc. of ethyl ether, whereafter 8 grams of hydroquinone and 0.1 gram of paratoluene-sulfonic acid are added while stirring. The mixture is boiled during 1 hour and allowed to stand overnight at 0° C. Then 5 volumes of petrol are added, and the mixture is filtered to yield 31.4 grams of complex, value E 380 mμ=1,100, that is, a 74% absorption yield.

*Example 12.—(Complex with hydroquinone in the presence of nitric acid)*

44.2 grams of retinene, value E 380 mμ=920, containing 30% of isomers reacting slowly to maleic anhydride are dissolved in 35 cc. of ether, and to this mixture 6 grams of hydroquinone and 0.5 cc. of nitric acid (at 36° Bé. diluted to one-third) are added. After allowing the mixture to stand overnight at room temperature, it is diluted in petrol and filtered to yield 23.6 grams of complex, value E 380 mμ=1,230, representing an absorption yield of 71.5%.

*Example 13.—(Complex with hydroquinone in the presence of iodine)*

43.7 grams of retinene, value E 380 mμ=892, containing 30% of isomers reacting slowly to maleic anhydride, are dissolved in 30 cc. of ether, and 50 milligrams of iodine and 8 grams of hydroquinone are added thereto. The mixture is boiled during 15 minutes and allowed to stand overnight at +10° C. Then, 250 cc. of petrol are added, and the mixture is filtered to yield 32.5 grams of complex, E 380 mμ=1,152 representing an absorption yield of 96%.

This raw compound, after reduction, yields a vitamin A alcohol containing only 5% of isomers reacting slowly to maleic anhydride.

What we claim is:

1. A method of converting a mixture of isomer retinenes into trans,trans-2,6-retinene by isomerizing the components of the mixture other than trans,trans-2,6-retinene into trans,trans-2,6-retinene and then complexing the trans,trans-2,6-retinene, said method comprising the steps of:

(1) adding an excess of a complexing agent selected from the group consisting of hydroquinone, pyrocatechol and tetrahalopyrocatechols to the mixture of isomer retinenes diluted in a solvent selected from the group consisting of petrol and ethyl ether;

(2) adding an isomerizing agent selected from the group consisting of hydriodic acid, sulfuric acid, hydrobromic acid, hydrochloric acid, nitric acid, p-toluene sulfonic acid and iodine in a ratio of 0.1% to 0.8% by weight based on the mixture of isomer retinenes;

(3) allowing the reaction mixture to stand at a temperature of between —10° C. and 25° C. until substantial conversion has taken place; and (4) filtering the reaction product to obtain crystals of trans,trans-2,6-retinene complex.

2. A method as claimed in claim 1, wherein the reaction mixture is diluted with petrol prior to filtering.

References Cited by the Examiner

UNITED STATES PATENTS

| | | | |
|---|---|---|---|
| 2,683,746 | 7/54 | Benton et al. | 260—598 |
| 2,683,747 | 7/54 | Benton et al. | 260—598 |
| 2,765,343 | 10/56 | Benton et al. | 260—598 |
| 2,765,344 | 10/56 | Benton et al. | 260—598 |

OTHER REFERENCES

Beilstein: Vol. II, page 750.

Zechmeister: Experientia, 1954, 10, 1–11.

LEON ZITVER, *Primary Examiner.*